No. 856,397. PATENTED JUNE 11, 1907.
F. N. DILLON.
SHAKING MECHANISM FOR GRATES.
APPLICATION FILED NOV. 10, 1904.
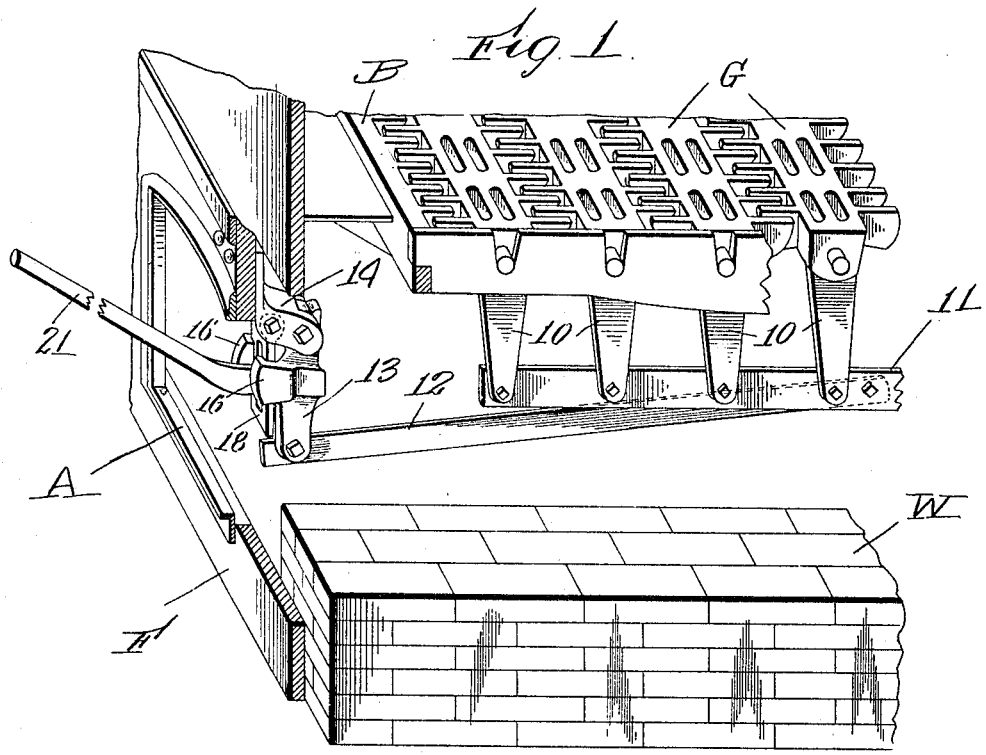
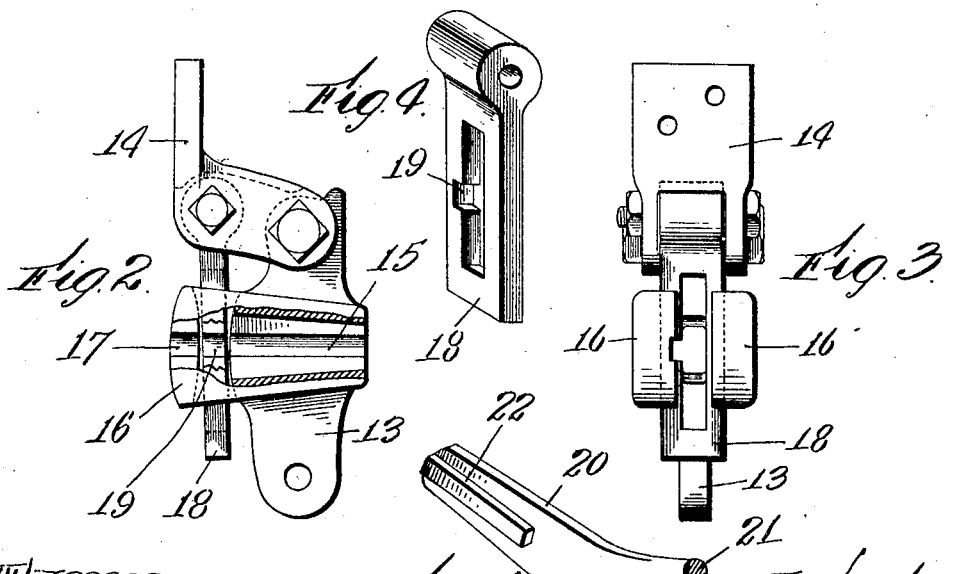

UNITED STATES PATENT OFFICE.

FREDERICK N. DILLON, OF FITCHBURG, MASSACHUSETTS.

SHAKING MECHANISM FOR GRATES.

No. 856,397.      Specification of Letters Patent.      Patented June 11, 1907.

Application filed November 10, 1904. Serial No. 232,202.

*To all whom it may concern:*

Be it known that I, FREDERICK N. DILLON, a citizen of the United States, residing at Fitchburg, in the county of Worcester and State of Massachusetts, have invented a new and useful Shaking Mechanism for Grates, of which the following is a specification.

This invention relates especially to that class of furnace-grates which use rocking or pivotally-supported grate-bars.

The especial object of this invention is to provide a shaking mechanism which will insure the maintenance of the grate-bars in normal horizontal positions.

To this end, this invention consists of the shaking mechanism for grates and of the combinations of parts therewith as hereinafter described and more particularly pointed out in the claims at the end of this specification.

In the accompanying drawing, Figure 1 is a perspective view partly broken away of sufficient parts of a steam boiler furnace to illustrate the application of this invention thereto. Fig. 2 is an enlarged side view partly broken away of part of the shaking mechanism. Fig. 3 is a front view of the parts shown in Fig. 2. Fig. 4 is a perspective view of the cover-plate which prevents the removal of the shaking handle except when the grate-bars are horizontal, and Fig. 5 is a perspective view of a part of the shaking handle.

In that class of grates to which this invention particularly relates each grate comprises a number of grate-bars which are pivotally supported so that they may be rocked or turned when it is desired to shake down the fire. These grate-bars are provided with laterally extending and intermeshing fingers or blades. In practice in order to get the best results from a grate of this character it is essential that the grate-bars should be kept horizontal while in use. This is necessary in order to provide a flat surface for the fire, and is also necessary in order to prevent the grate-bar fingers or blades from being burned off or oxidized by reason of extending up into the mass of burning coals.

The especial object of my present invention is to provide means which will prevent the grate-bars from being left in tipped or tilted positions, thus insuring an even supporting surface for the fire and preventing the shortening of the life of the grate-bars by burning off or injuring the projecting fingers or blades as above described.

In the specific construction herein illustrated, the shaking connections comprise a socket-piece which receives the blade of the shaking handle, and a cover-plate which coöperates with the socket-piece, the said socket-piece and cover plate being provided with means co-operating with the shaking handle for preventing the removal of the handle except when the grate-bars are in normal or horizontal position. By means of this construction, the shaking handle can be removed only when slots or key-ways in the socket-piece and its cover plate, which in the drawings represents said means, are in alinement. These slots are only brought into alinement when the grate-bars occupy their normal horizontal position, and this will insure the grate-bars being returned and left in normal position after each shaking operation.

Referring to the accompanying drawing and in detail, W designates a portion of one of the side walls of a boiler furnace, and F designates the front iron frame. Fastened upon or carried with the boiler front F is the ash-door casing A.

The frame of the grate is designated by the reference letter B and pivotally supported in the side-pieces of the frame B are the rocking grate-bars G which are provided with the usual intermeshing projecting fingers or blades. Each rocking grate-bar G is provided with a downwardly extending arm 10. At their lower ends the arms 10 are connected to a connecting bar 11, and extending from the connecting bar 11 is a connecting link 12 which is pivotally connected at its forward end to the socket-piece 13. The upper end of the socket-piece 13 is pivotally supported in the bracket 14. These parts constitute the shaking connections for the oscillating grate-bars. The socket-piece is provided with a vertical slot or socket for receiving the blade of a shaking-handle, and formed in one side of the socket is a key-way or groove 15. Extending forward from the face of the socket-piece 13 are cheek-pieces 16, one of said cheek-pieces being provided with a key-way or slot 17 in alinement with the key-way or slot 15. Mounted in the cheek-pieces 16 and guided thereby is a cover-plate 18. The cover-plate 18 is pivotally supported at its upper end in a bracket 14, and is provided with a vertical slot or recess for receiving the blade of the shaking-handle. At one side of its vertical slot or recess, the cover-plate is provided with a key-way or slot 19.

The shaking-handle consists of a bar or rod 21 having a blade 20 at its lower end, which blade 20 has a rib or spline 22 projecting from one side thereof.

It will be noted that the cover-plate 18 is independently pivoted, or is supported upon a different center from the socket-piece. It will also be noted that the opposed faces of the cheek-pieces and socket-piece are curved. This will allow the rocking of the socket-piece upon its pivot, and the rocking of the cover-plate upon its pivot as the grate-bars are oscillated.

By means of this construction when the parts are in normal position, the key-ways or slots 19, 17 and 15 will be brought into alinement. This will permit the insertion of the shaking-handle, so that the grate-bars may be shaken or tipped as desired, after which the rib or key 22 of the shaking-handle will prevent the removal of the shaking handle until said key-ways have again been brought into alinement, thus insuring the grate-bars being left in their normal or horizontal position. If the shaking handle is left in operative position it stands in the way of the fireman, so that the fireman naturally will pull the handle out after the same has been used.

I am aware that changes may be made in practicing my invention by those who are skilled in the art, without departing from the scope thereof as expressed in the claims, and while my invention has been especially designed for use in connection with rocking or pivotally supported grate-bars, I am aware that it may be used to advantage with certain other different types of grates. I do not wish, therefore, to be limited to the construction which I have herein shown and described, but What I do claim and desire to secure by Letters Patent of the United States is:—

1. The combination of the rocking grate-bars, a pivoted socket-piece, means for connecting the socket-piece and grate-bars, and an independently pivoted cover-piece fitting over the socket-piece, said socket-piece and cover-plate having slots or keyways which are in alinement when the grate-bars are in horizontal position and which are out of alinement when the grate-bars are tilted.

2. The combination of the rocking grate-bars, and connections having means for preventing the removal of a shaking-handle except when the grate-bars are in horizontal position, comprising a pivotally supported socket-piece, and a cover-plate pivotally supported upon a different center from the socket-piece, said socket-piece and cover-plate having key-ways or slots which are in alinement when the parts are in normal position and out of alinement when the grate-bars are tilted.

3. The combination of rocking grate-bars, and connections having means for preventing the removal of a shaking handle except when the grate-bars are horizontal, comprising a pivotally supported socket-piece with cheek-pieces extending forward therefrom said socket-piece and said cheek-pieces having keyways or slots therein, and a cover-plate held in place by the cheek-pieces and pivotally supported upon a different center from the socket-piece, said cover-plate having a key-way or slot which is in alinement with the key-ways or slots in the socket-piece and the cheek-pieces when the parts are in normal position and out of alinement when the grate bars are tilted.

4. The combination of rocking grate-bars each having a downwardly extending arm, a connecting bar pivoted to said arms, a pivotally supported socket-piece, a link connecting the socket-piece and connecting bar, and an independently pivoted cover-plate, said socket-piece and cover-plate having key-ways or slots which when the parts are in normal position are in alinement to receive the rib or projection of a shaking-handle, and out of alinement when the grate-bars are tilted.

5. The combination of rocking grate-bars, a pivoted socket-piece, connections from the pivoted socket-piece to the rocking grate-bars, cheek-pieces formed on the socket-piece, the opposing faces of the cheek-pieces and the socket piece being rounded, an independently pivoted cover-plate fitting between the cheek-pieces and socket-piece, said cover-plate, cheek-pieces, and socket-piece having keyways or slots which when the grate-bars are in horizontal position are in alinement to receive the rib or projection of a shaking handle.

6. The combination with movable grate-bars, of a pivoted socket-piece, means for connecting the socket piece and grate-bars to move the grate-bars when the socket-piece is moved, and an independently pivoted cover-piece, said socket-piece and cover piece having slots or keyways adapted to register with each other when the grate-bars are in horizontal position, and to be out of registration when the grate-bars are tilted, whereby a shaking handle having a projection adapted to pass through said slots or keyways can be withdrawn only when the grate-bars are in normal horizontal position.

7. The combination with movable grate-bars, of a pivoted socket piece, means for connecting the socket-piece and grate-bars for moving the latter when the socket piece is moved, and an independently pivoted cover piece fitting over the socket piece, said socket piece and cover piece having means for preventing the withdrawal of a shaking handle when the grate bars are tilted, and permitting its withdrawal when they are in normal horizontal position.

In testimony whereof I have hereunto set my hand, in the presence of two subscribing witnesses.

FREDERICK N. DILLON.

Witnesses:
 PHILIP W. SOUTHGATE,
 LOUIS W. SOUTHGATE.